(12) United States Patent
Bassett et al.

(10) Patent No.: US 7,378,974 B1
(45) Date of Patent: May 27, 2008

(54) CHILD SEAT SAFETY SYSTEM

(76) Inventors: William C. Bassett, 6780 NW. 14th Ct., Margate, FL (US) 33063-2511; Georgina Bassett, 6780 NW. 14th Ct., Margate, FL (US) 33063-2511

(*) Notice: Subject to any disclaimer, the term of this patent is extended or adjusted under 35 U.S.C. 154(b) by 307 days.

(21) Appl. No.: 11/119,281

(22) Filed: Apr. 28, 2005

(51) Int. Cl.
*G08B 23/00* (2006.01)

(52) U.S. Cl. ............... 340/573.1; 340/667; 340/573.4; 701/45

(58) Field of Classification Search ............. 340/573.1, 340/573.4, 667
See application file for complete search history.

(56) References Cited

U.S. PATENT DOCUMENTS

| 6,847,302 B2* | 1/2005 | Flanagan et al. ........... 340/666 |
| 6,922,147 B1* | 7/2005 | Viksnins et al. ......... 340/573.1 |
| 6,924,742 B2* | 8/2005 | Mesina .................... 340/573.1 |
| 2006/0103516 A1* | 5/2006 | Zang .......................... 340/457 |

* cited by examiner

*Primary Examiner*—Benjamin C. Lee
*Assistant Examiner*—Samuel J. Walk

(57) ABSTRACT

A child seat safety system for alerting a person to a child buckled in a vehicle safety seat is disclosed. The child seat safety system includes a main controller for attachment to the vehicle safety seat. At least one alerting device having at least one lighting device is provided in signal-receiving relationship to the main controller for activation by the main controller while the child remains in the vehicle safety seat.

6 Claims, 7 Drawing Sheets

CHILD SEAT SAFETY SYSTEM

FIELD OF THE INVENTION

The present invention relates to child safety devices. More particularly, the present invention relates to a child seat safety system which is adapted for a child car seat and includes alert features to notify a vehicle operator or occupant that a child has been left in the car seat.

BACKGROUND OF THE INVENTION

Infants or children under five years of age are typically transported in vehicles by strapping the infant or child in a car seat which is anchored to a rear seat of the vehicle using the vehicle seat belt. Each year, however, infants or children are inadvertently left in car seats as the driver and other occupants of the vehicle park and leave the vehicle. In hot summer weather, this has severely injured or killed infants and children in the past due to the excessive heat in the vehicle.

Therefore, a child seat safety system is needed to notify a vehicle operator or other occupant that an infant or child has been left in a vehicle seat so the infant or child can be retrieved from the vehicle.

SUMMARY OF THE INVENTION

The present invention is generally directed to a child seat safety system for alerting a person to a child buckled in a vehicle safety seat. The child seat safety system includes a main controller for attachment to the vehicle safety seat. At least one alerting device having at least one lighting device is provided in signal-receiving relationship to the main controller for activation by the main controller while the child remains in the vehicle safety seat.

BRIEF DESCRIPTION OF THE DRAWINGS

The invention will now be described, by way of example, with reference to the accompanying drawings, in which.

DETAILED DESCRIPTION OF THE INVENTION

Figure 1:
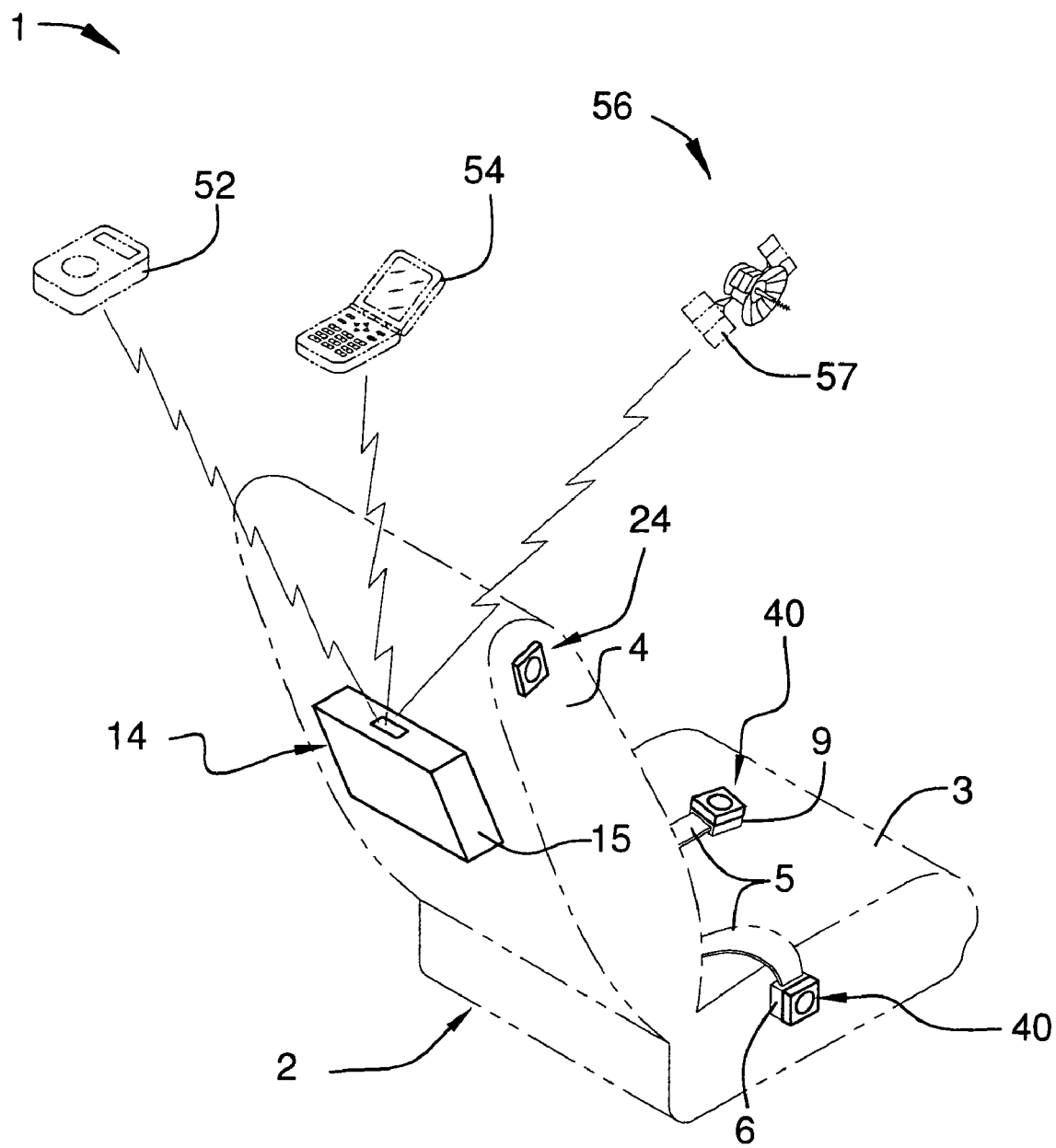
FIG. 1 is a perspective, partially schematic view of an illustrative embodiment of the child seat safety system according to the present invention, mounted on a car seat (in phantom)
Figure 2:
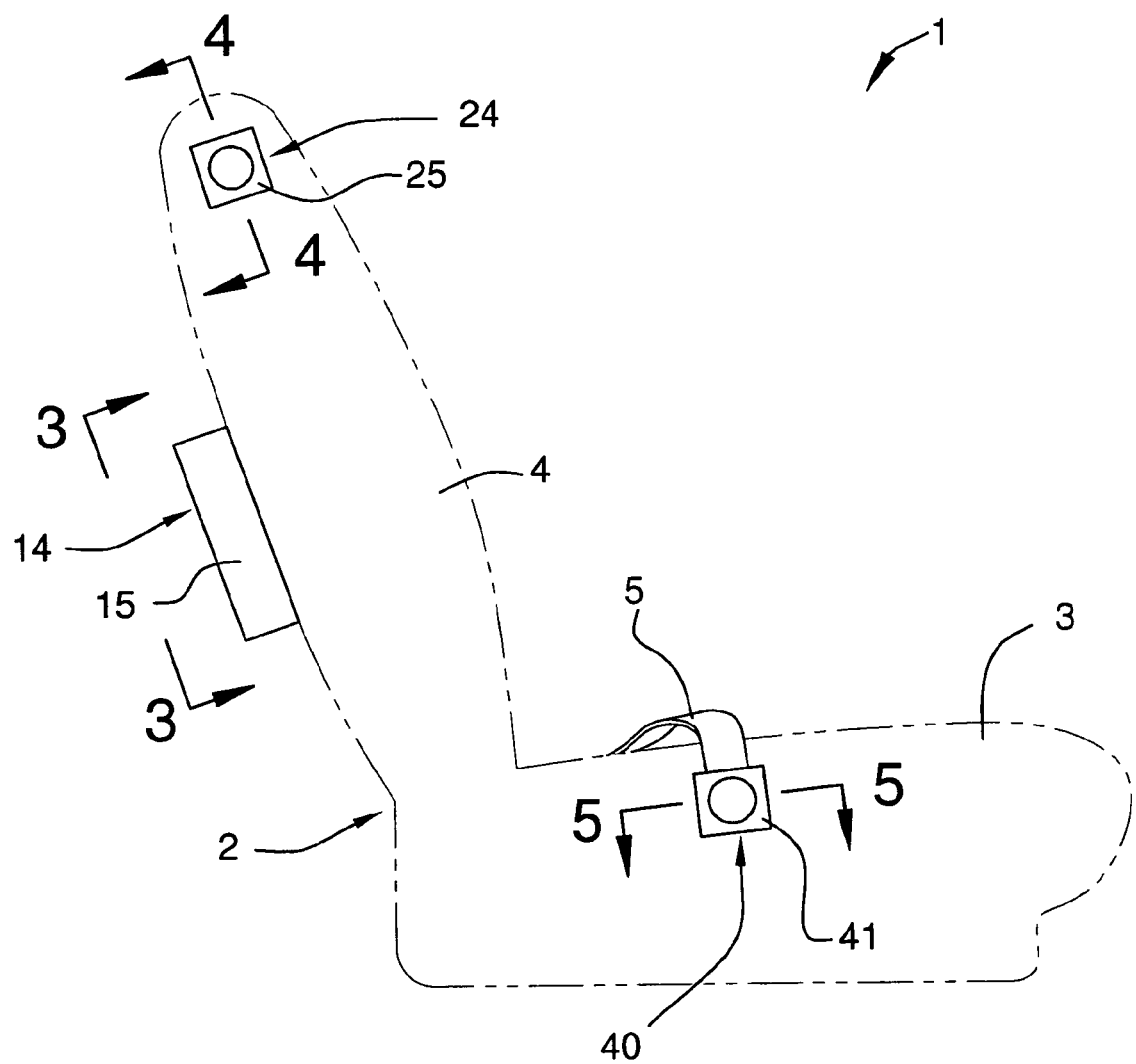
FIG. 2 is a side view of a car seat fitted with the various components of the child seat safety system according to the present invention.

Referring to the drawings, an illustrative embodiment of the child seat safety system, hereinafter system, of the present invention is generally indicated by reference numeral 1. The system 1 is designed for attachment to a vehicle infant or child seat 2, which may be conventional. As shown in FIGS. 1 and 2, the vehicle infant or child seat 2 typically includes a seat 3 and a backrest 4. Seat belts 5, one of which terminates in a buckle 6 (FIG. 6), are attached to the seat 3, backrest 4 or other element of the vehicle infant or child seat 2. The buckle 6 typically includes a latch slot 7 (FIG. 6) which is adapted to receive a latch 9 provided on the end of the other seat belt 5. A latch button 8 is provided on the buckle 6 to release the latch and unfasten the seat belts 5 when the latch is inserted in the latch slot 7, typically in conventional fashion. The vehicle infant and child seat 2 is typically attached to the seat (not shown) inside a vehicle (not shown) using the vehicle seat belts (not shown), or may be attached to the vehicle using an alternative fastening technique.

As shown in FIG. 1, the system 1 typically includes a main controller 14 which is attached to the vehicle infant or child seat 2, such as to the backrest 4 thereof, for example. Multiple main alerting devices 24, the details of which will be hereinafter described, are provided on the seat 3, backrest 4 or other element of the vehicle infant or child seat 2. Alternatively or additionally, a main alerting device or devices 24 may be provided on the interior surface of a vehicle window 60 (FIG. 5) or other element of the vehicle in which the vehicle infant or child seat 2 is placed. At least one buckle alerting device 40 may be provided on the buckle 6, the latch 9, or both the buckle 6 and the latch 9 of the seat belts 5.

Figure 3:
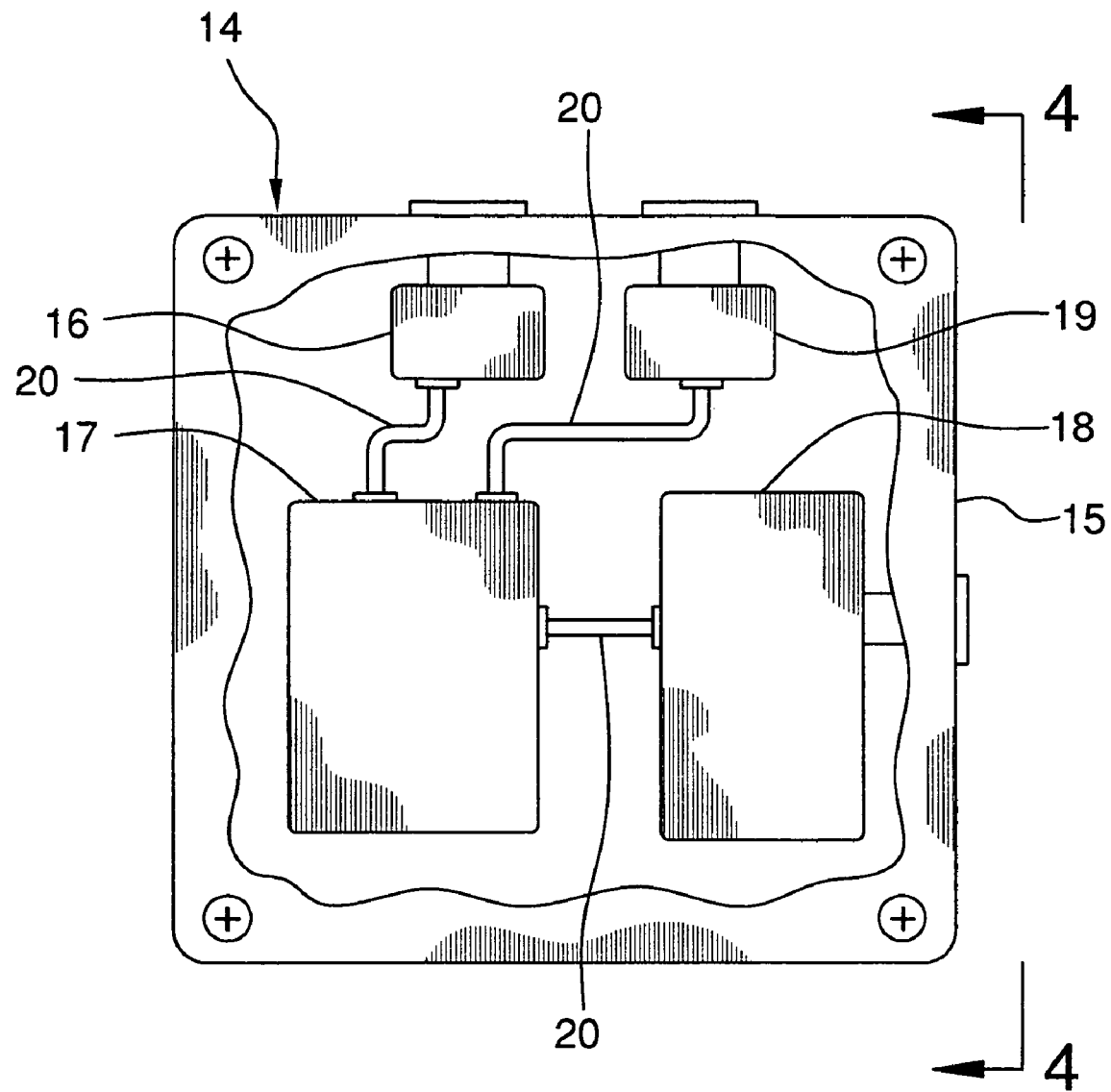
FIG. 3 illustrates interior components of a main controller component of the child seat safety system.

As shown in FIG. 3, the main controller 14 typically includes a housing 15 which contains a receiver 16, a microprocessor 17 connected to the receiver 16, and a chargeable battery 18 and a transmitter 19 connected to the microprocessor 17. The components of the main controller 14 may be connected to each other with suitable wiring 20. The receiver 16 may be adapted to receive activation or de-activation signals from a hand-held transmitter (not shown), for example, to facilitate wireless activation and de-activation of the main controller 14. Additionally or alternatively, the main controller 14 may be capable of activation manually such as by manipulation of a power switch (not shown) provided typically on the housing 15.

Through the transmitter 19, the microprocessor 17 includes the capability to activate the main alerting devices 24 and buckle alerting devices 40 such that the main alerting devices 24 and buckle alerting devices 40 emit visual, audible or both visual and audible signals, as will be hereinafter described. The microprocessor 17 may further include a timer circuit (not shown) which activates the main alerting devices 24 and buckle alerting devices 40 at selected time intervals or after a selected time period has elapsed since initial activation of the main controller 14. Furthermore, the microprocessor 17 may include the capability of activating a pager 52 or a cell phone 54 after a selected time period has expired since activation of the main controller 14. Additionally, the system 1 may be provided with a GPS (global positioning system) 56 in which the microprocessor 17 is capable of transmitting signals to a satellite 57, which transmits signals to a hand-held GPS device (not shown) that may be used to continually track the location of the vehicle infant or child seat 2.

Figure 4:
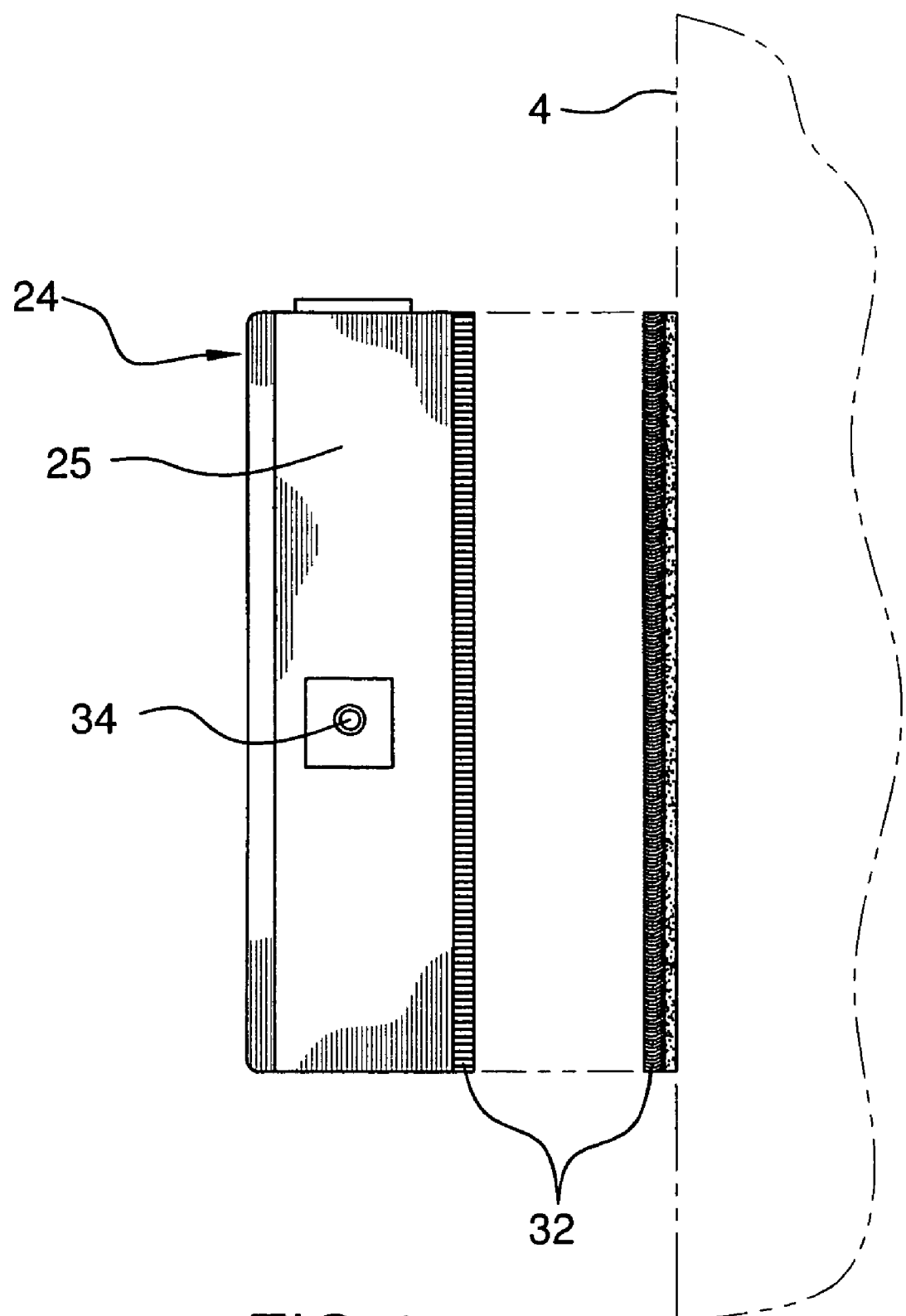
FIG. 4 is a side view of an alerting device of the child seat safety system, illustrating typical attachment of the device to the rear of a child car seat.
Figure 5:
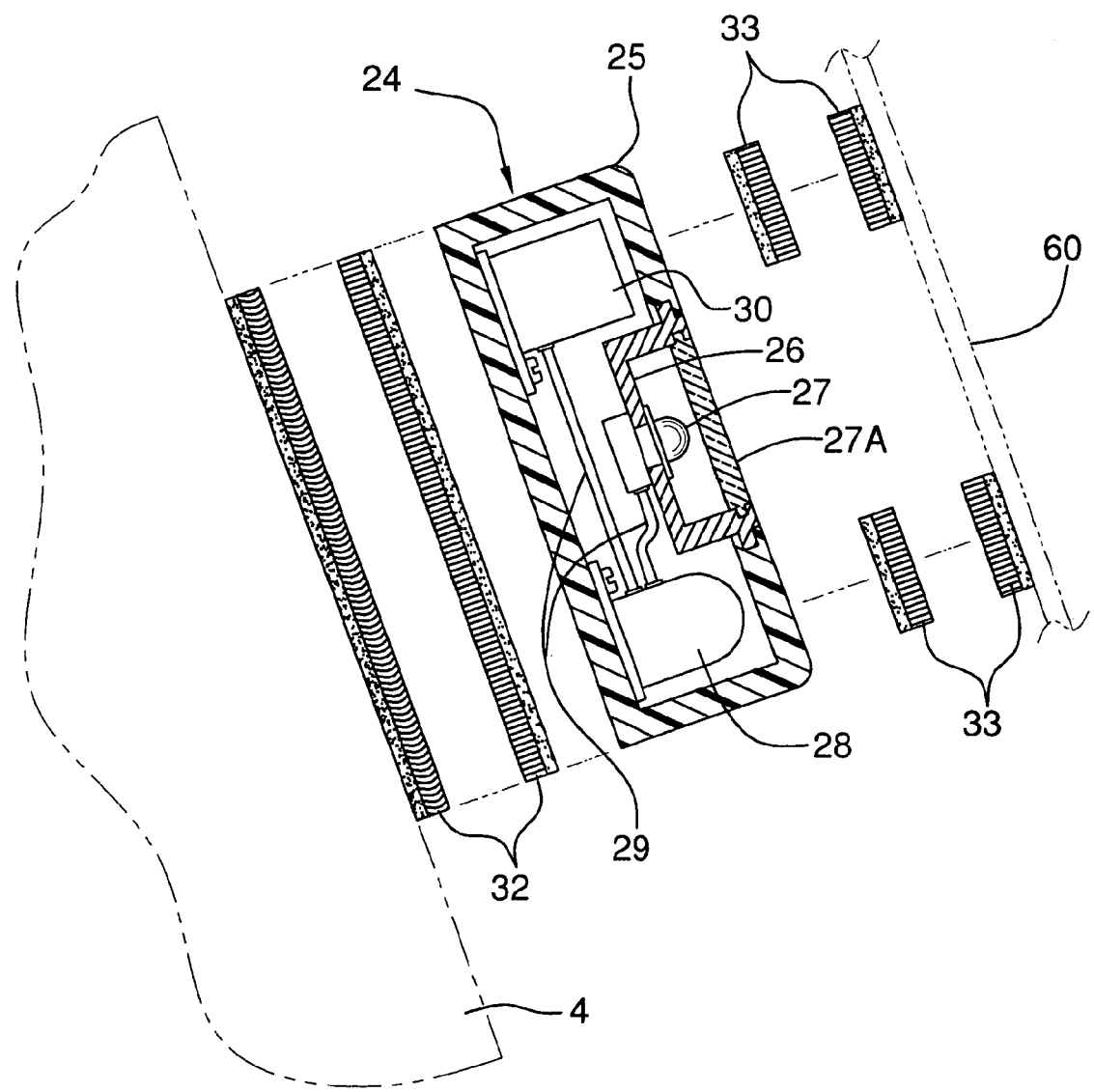
FIG. 5 is a cross-section of the alerting device.

As shown in FIGS. 4 and 5, each main alerting device 24 typically includes a housing 25 which is attached to the backrest 4 or other component of the vehicle infant or child seat 2 by hook and loop fastener strips 32 or other suitable technique. As shown in FIG. 5, a main alerting device 24 may additionally or alternatively be attached to the interior surface of a vehicle window 60 or other element of the vehicle typically using hook and loop fastener strips 33 or other suitable technique. As shown in FIG. 5, the housing 25 contains a receiver 30 which is connected to a microprocessor 28 typically by wiring 29. A light unit 26 is also provided in the housing 25 and contains a lighting device 27, such as a light-emitting diode (LED), for example. A transparent or translucent lens 27a typically covers the light bulb 27. A battery (not shown), which may be a rechargeable battery, is further provided in the housing 25 and is connected to the microprocessor 28 and the receiver 30. As shown in FIG. 4, a battery charging port 34 may be provided on the exterior of the housing 25 to facilitate charging of the battery, as necessary. In use of the system 1, the main controller 14 emits activation signals which are received by the receiver 30. The microprocessor 28, in turn, energizes the lighting device 27 and may cause the lighting device 27 to flash or illuminate continuously. The main alerting device 24 may further include a speaker (not shown) or other audible alert device which is connected to the microprocessor 28 to emit audible alert signals during use of the system 1.

Figure 6:
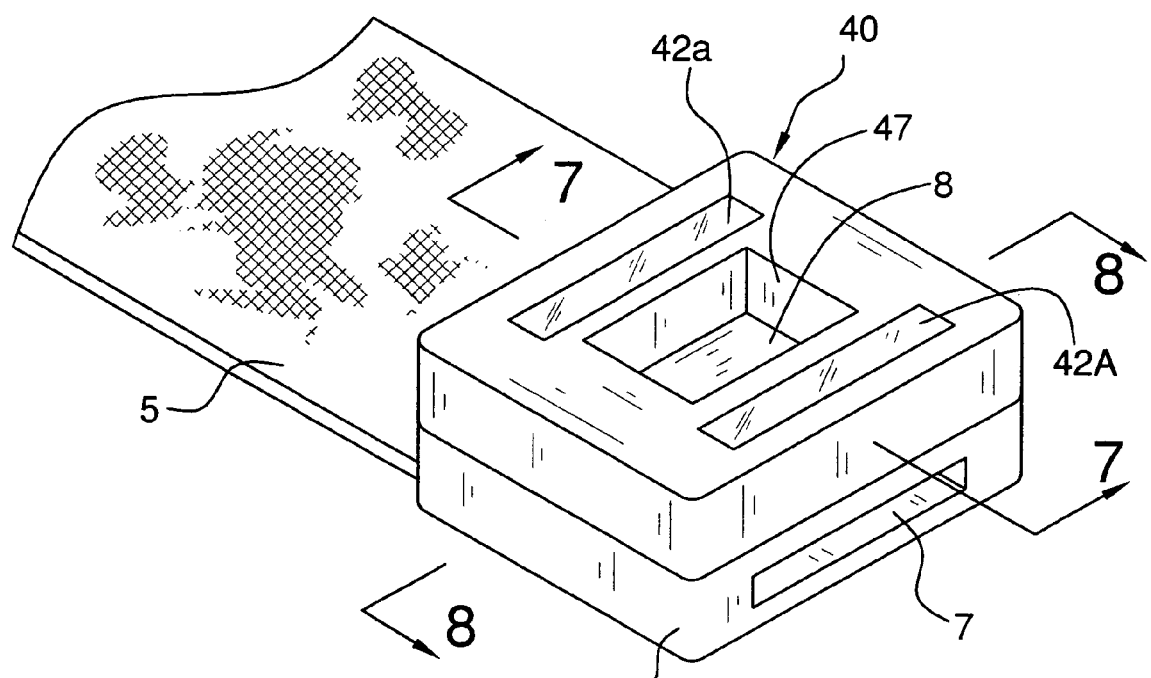
FIG. 6 is a perspective view of a buckle-mounted alerting device of the child seat safety system.
Figure 7:
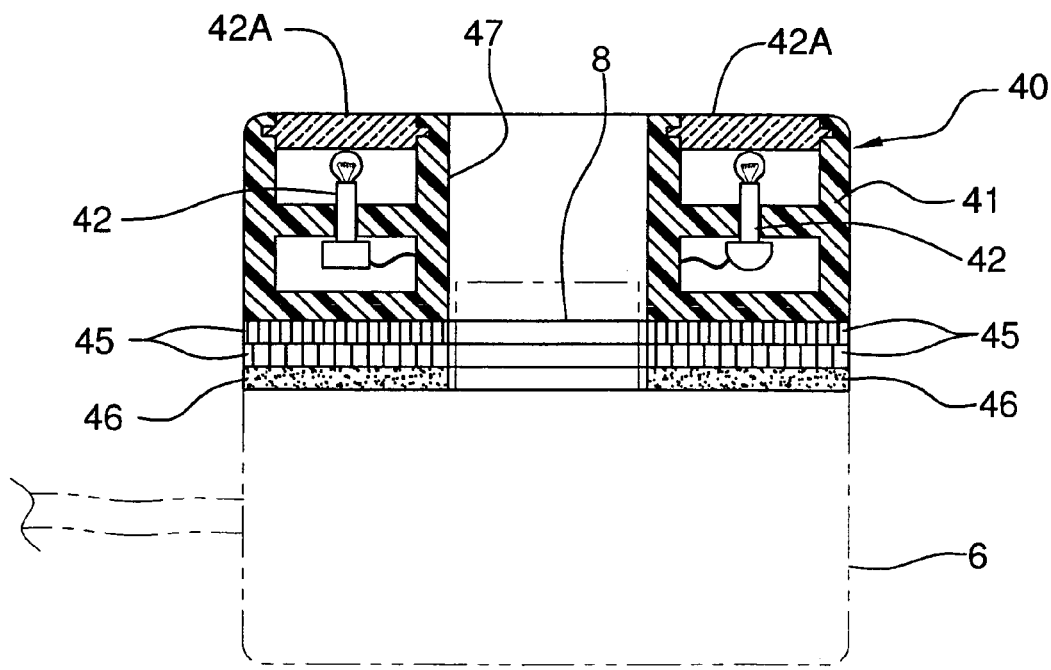
FIG. 7 is a cross-sectional view, taken along section lines 7-7 in FIG. 6.
Figure 8:
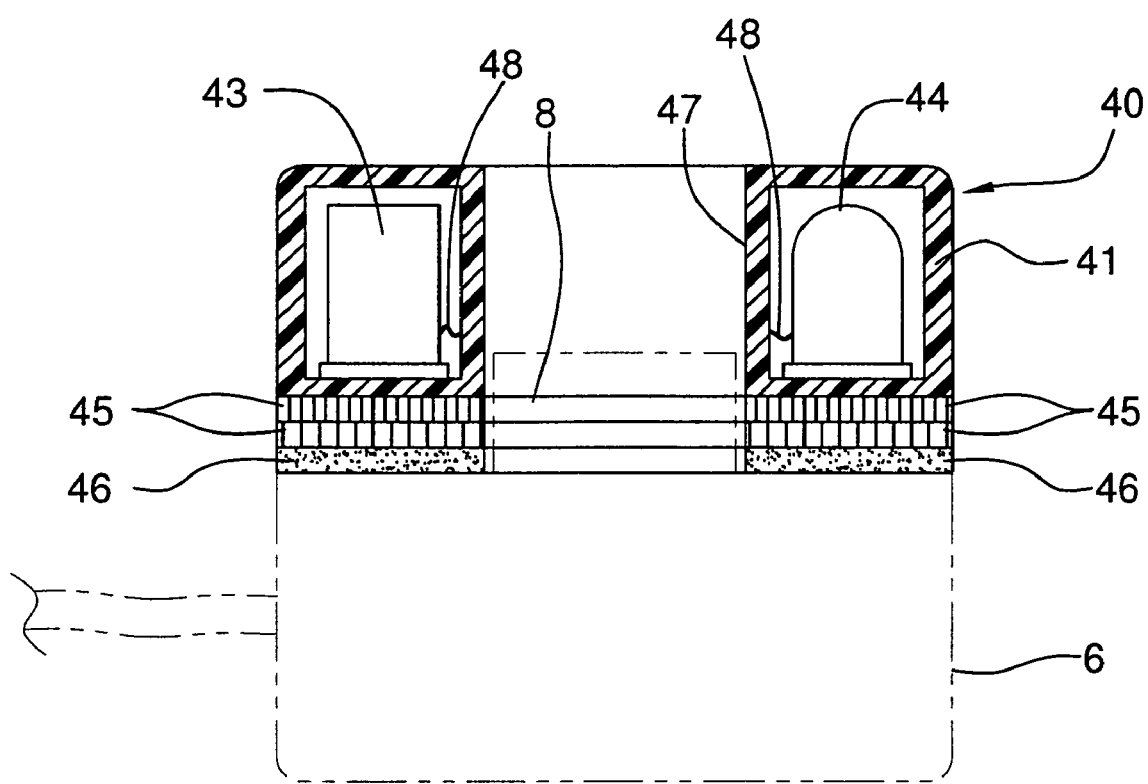
FIG. 8 is a cross-sectional view, taken along section lines 8-8 in FIG. 6.

As shown in FIGS. 6-8, each buckle alerting device 40 typically includes a housing 41 having a central opening 47 extending therethrough. A lighting device 42, each of which is typically covered by a transparent or translucent lens 42a, is provided in the housing 41, typically on each side of the central opening 47. As shown in FIG. 8, the housing 41 typically further contains a receiver 43 and a microprocessor 44 connected to the receiver 43 typically by wiring 48. A battery (not shown), which may be a rechargeable battery, for example, is provided in the housing 41 and is connected to the receiver 43, the microprocessor 44 and the lighting devices 42. Accordingly, the receiver 43 is adapted to receive activation signals from the main controller 14. In turn, the microprocessor 44 energizes the lighting devices 42 and may cause the lighting devices to flash or illuminate continuously. The buckle alerting device 40 may further include a speaker (not shown) or other audible alert device which is connected to the microprocessor 28 to emit audible alert signals during use of the system 1.

Hook and loop fasteners 45 and adhesive 46 or a suitable alternative technique are typically used to mount one of the buckle alerting devices 40 on the buckle 6 and the other buckle alerting device 40 on the latch 9 (FIG. 1). As shown in FIGS. 7 and 8, the buckle alerting device 40 which is attached to the buckle 6 is attached to the buckle 6 in such a manner that the latch button 8 of the buckle 6 is exposed through the central opening 47 of the housing 41. This facilitates release of the latch 9 from the buckle 6 by depression of the latch button 8 through the central opening 47.

In typical use of the system 1, the main controller 14 is initially turned on or activated before or after an infant or child (not shown) is placed in the vehicle infant or child seat 2 inside a vehicle (not shown). This may be accomplished using a hand-held transmitter (not shown), for example, or by manipulation of a power switch (not shown) provided on the housing 15 of the main controller 14. Accordingly, the main controller 14 continually activates the main altering devices 24 and buckle alerting devices 40, causing these devices to emit light signals and/or audible signals either continually or in a flashing pattern as long as the infant or child remains in the vehicle infant or child seat 2. Alternatively or additionally, the main controller 14 may be adapted to emit audible alert signals as long as it is activated. The light signals emitted by the main alerting devices 24 and buckle alerting devices 40 are easily visible through the windows of the vehicle. When the vehicle arrives at its destination, the vehicle operator or other vehicle occupant normally removes the infant or child from the vehicle infant or child seat 2 and turns off the main controller 14 using either the hand-held transmitter (not shown) or manual power switch (not shown), thereby deactivating the main altering devices 24 and buckle alerting devices 40.

In the event that the vehicle operator or other occupants arrive at the destination of the vehicle and inadvertently leave the vehicle without removing the infant or child from the vehicle infant or child seat 2, the main controller 14 continues to activate the main alerting devices 24 and buckle alerting devices 40. Because the light signals emitted from the devices are easily visible through the windows of the vehicle, the vehicle operator or other occupant is notified that the infant or child is still buckled in the vehicle infant or child seat 2. Thus, the child or infant can be timely unbuckled from the vehicle infant or child seat 2.

As was set forth herein above, the main controller 14 may be programmed to activate a pager 52 or a cell phone 54, which is carried by the vehicle operator or other occupant of the vehicle, after a predetermined period of time has elapsed. Therefore, in the event that the vehicle operator or other occupant fails to see the visual alert signals emitted by the main alerting devices 24 and buckle alerting devices 40, the activated pager 52 or cell phone 54 notifies the person that the infant or child is still buckled in the vehicle infant or child seat 2, facilitating timely rescue of the infant or child from the vehicle infant or child seat 2. Furthermore, in the event of a car-jacking episode, the GPS 56 continually tracks the location of the vehicle infant or child seat 2, thus increasing the likelihood that the infant or child will be safely rescued from the vehicle.

While the preferred embodiments of the invention have been described above, it will be recognized and understood that various modifications can be made in the invention and the appended claims are intended to cover all such modifications which may fall within the spirit and scope of the invention.

What is claimed is:

1. A child seat safety system comprising:
  a main controller for attachment to a seat;
  at least one alerting device having at least one lighting device provided in signal-receiving relationship to said main controller for activation by said main controller;
  said at least one alerting device comprises at least one main alerting device and at least one buckle alerting device said at least one buckle alerting device comprises a housing and a central opening extending through said housing; and
  at least one of a pager and a cell phone provided in signal-receiving relationship to said main controller for activation by said main controller.

2. The system of claim 1 further comprising a global positioning system interfacing with said main controller for monitoring locations of said main controller.

3. The system of claim 1 wherein said at least one alerting device comprises a microprocessor connected to said at least one lighting device and a receiver connected to said microprocessor.

4. The system of claim 1 wherein said at least one alerting device is capable of emitting an audio signal.

5. The system of claim 1 wherein said main controller comprises a housing, a microprocessor provided in said housing and a transmitter connected to said microprocessor.

6. The system of claim 5 further comprising a receiver provided in said housing and connected to said microprocessor.

* * * * *